(12) United States Patent
Lee et al.

(10) Patent No.: US 12,556,828 B2
(45) Date of Patent: Feb. 17, 2026

(54) ELECTRONIC DEVICE HAVING STRUCTURE IN WHICH CAMERA IS DISPOSED UNDER DISPLAY

(71) Applicant: SAMSUNG ELECTRONICS CO., LTD., Suwon-si (KR)

(72) Inventors: Wooyong Lee, Suwon-si (KR); Kwangkyu Park, Suwon-si (KR); Daehyun Sung, Suwon-si (KR); Jonghoon Won, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 422 days.

(21) Appl. No.: 17/917,687

(22) PCT Filed: Jan. 25, 2021

(86) PCT No.: PCT/KR2021/000963
§ 371 (c)(1),
(2) Date: Oct. 7, 2022

(87) PCT Pub. No.: WO2021/162276
PCT Pub. Date: Aug. 19, 2021

(65) Prior Publication Data
US 2024/0267637 A1    Aug. 8, 2024

(30) Foreign Application Priority Data
Feb. 10, 2020    (KR) .................. 10-2020-0015935

(51) Int. Cl.
*H04N 23/90*    (2023.01)
*G06F 1/16*    (2006.01)
*H04N 23/57*    (2023.01)

(52) U.S. Cl.
CPC .......... *H04N 23/90* (2023.01); *G06F 1/1626* (2013.01); *G06F 1/1637* (2013.01); *G06F 1/1686* (2013.01); *H04N 23/57* (2023.01)

(58) Field of Classification Search
CPC ...... G06F 1/1626; G06F 1/1637; G06F 1/686; G06F 21/44; G06F 3/1423;
(Continued)

(56) References Cited

U.S. PATENT DOCUMENTS 9,438,713 B2    9/2016 Lee et al.
10,366,272 B2    7/2019 Song et al.
(Continued)

FOREIGN PATENT DOCUMENTS

CN    107305411 A    10/2017
CN    108363520 A    8/2018
(Continued)

OTHER PUBLICATIONS

European Search Report for EP Application No. 21754022.8 mailed on Oct. 12, 2023.
(Continued)

*Primary Examiner* — Young Lee
(74) *Attorney, Agent, or Firm* — CANTOR COLBURN LLP

(57) ABSTRACT

According to various embodiments of the present disclosure, an electronic device comprises: a display including a light transmitting area and a drawing area surrounding the light transmitting area; a first camera disposed below the light transmitting area when looking at the light transmitting area from above the display; a processor operatively coupled to the display and the first camera; and a memory operatively coupled to the processor. The processor may be configured to store an application in the memory and draw a pattern on
(Continued)

the drawing area on the basis of an execution state of the application. Various other embodiments are also possible.

14 Claims, 10 Drawing Sheets

(58) Field of Classification Search
CPC .......... G09G 2300/023; H04M 1/0264; H04M 1/0266; H04N 23/45; H04N 23/57; H04N 23/90
See application file for complete search history.

(56) References Cited

U.S. PATENT DOCUMENTS

| | | |
|---|---|---|
| 10,381,485 B2 | 8/2019 | Kang et al. |
| 11,363,180 B2 | 6/2022 | Bachar et al. |
| 11,442,304 B2 | 9/2022 | Okita |
| 2007/0274703 A1 | 11/2007 | Matsuda |
| 2014/0118591 A1 | 5/2014 | Maglaque |
| 2016/0111062 A1 | 4/2016 | Hicks |
| 2016/0202515 A1 | 7/2016 | Watanabe et al. |
| 2016/0286188 A1 | 9/2016 | Osawa et al. |
| 2017/0084231 A1 | 3/2017 | Chew |
| 2017/0162111 A1 | 6/2017 | Kang et al. |
| 2017/0228593 A1 | 8/2017 | Chiang |
| 2017/0235398 A1 | 8/2017 | Choi et al. |
| 2018/0114493 A1 | 4/2018 | Mclaughlin |
| 2018/0288312 A1 | 10/2018 | Cheaz et al. |
| 2019/0041909 A1 | 2/2019 | Pakula et al. |
| 2019/0130822 A1* | 5/2019 | Jung .................. G09G 3/3208 |
| 2019/0310724 A1 | 10/2019 | Yeke Yazdandoost et al. |
| 2019/0319212 A1 | 10/2019 | Park et al. |
| 2020/0209938 A1 | 7/2020 | Yao |
| 2021/0083227 A1 | 3/2021 | Her et al. |
| 2021/0157362 A1 | 5/2021 | Jo et al. |
| 2022/0020321 A1 | 1/2022 | Jung et al. |
| 2022/0026771 A1 | 1/2022 | Yan et al. |

FOREIGN PATENT DOCUMENTS

| | | |
|---|---|---|
| CN | 109541833 A | 3/2019 |
| CN | 110661949 A | 1/2020 |
| EP | 3585037 A1 | 12/2019 |
| EP | 3889678 A1 | 10/2021 |
| JP | 2016180709 A | 10/2016 |
| JP | 2020118879 A | 8/2020 |
| KR | 20010056621 A | 7/2001 |
| KR | 20130027335 A | 3/2013 |
| KR | 10-2013-0104765 A | 9/2013 |
| KR | 20140086708 A | 7/2014 |
| KR | 20150103778 A | 9/2015 |
| KR | 10-2017-0000447 A | 1/2017 |
| KR | 20180044200 A | 5/2018 |
| KR | 10-2019-0089578 A | 7/2019 |
| KR | 10-2019115 B1 | 9/2019 |
| KR | 10-2019-0121604 A | 10/2019 |
| KR | 20200027515 A | 3/2020 |
| KR | 20200140327 A | 12/2020 |
| WO | 2017164680 A1 | 9/2017 |
| WO | WO-2021047325 A1 * | 3/2021 .......... H04M 1/0264 |

OTHER PUBLICATIONS

European Search Report for EP Application No. 21754022.8 mailed on May 30, 2023.
Written Opinion mailed Apr. 22, 2021 for PCT/KR2021/000963.
International Search Report mailed Apr. 22, 2021 for PCT/KR2021/000963.
Korean Notice of Allowance for KR Application No. 10-2020-0015935 mailed on Sep. 3, 2024.
The European Office Action for EP Application No. 21754022.8 mailed on Apr. 23, 2025.
Chinese Office Action for CN 202180027680.4 mailed on Dec. 23, 2025, citing the above reference(s).

* cited by examiner

ELECTRONIC DEVICE HAVING STRUCTURE IN WHICH CAMERA IS DISPOSED UNDER DISPLAY

TECHNICAL FIELD

Various embodiments relate to an electronic device including a display and a camera.

BACKGROUND ART

An electronic device (e.g., a smartphone) may include a large-screen touch-sensitive display for wide visibility and ease of operation. According to the demand for a large screen, a display may extend over the entire front surface of an electronic device, and a camera may be arranged below the display.

DISCLOSURE OF INVENTION

Technical Problem

A display may include a light passing area. The camera may be arranged below the light passing area when the light passing area is viewed from above the display. The light passing area may be formed, for example, as an opening so that external light can be smoothly introduced into the lens of the camera. This arrangement structure enables the expansion of the display and the smooth arrangement of the camera. However, when light is emitted from a pixel located in the vicinity of the light passing area, the light may be reflected into the lens of the camera by a cover member (e.g., glass) provided on the front surface, which may cause an image photographed by the camera to include an unwanted pattern (e.g., spread of light).

Various embodiments are able to provide an electronic device in which the periphery of a light passing area in a display is able to block light emitted from a display from flowing into a lens of a camera arranged below the display, so that the quality of an image photographed by the camera may be improved. In addition, various embodiments are able to provide an electronic device that is able to use the periphery of the light passing area for various purposes (e.g., for notification or as an iris for giving an optical effect to a photographed image) in addition to blocking light.

Solution to Problem

According to various embodiments, an electronic device may include: a display including a light passing area and a drawing area surrounding the light passing area; a first camera arranged below the light passing area when the light passing area viewed from above the display; a processor operatively coupled to the display and the first camera; and a memory operatively connected to the processor, wherein the processor may be configured to store an application in the memory, and draw a pattern in the drawing area based on an execution state of the application.

According to various embodiments, a portable electronic device may include: a display disposed on a front surface of the portable electronic device and including a light passing area and a drawing area surrounding the light passing area; a front camera arranged below the light passing area when the light passing area viewed from above the display; a rear camera disposed on the rear surface of the electronic device; and a processor operatively coupled to the display, the front camera, and the rear camera, wherein the processor may be configured to use the drawing area as an area to display an image photographed by the rear camera based on recognizing that, of the front camera and the rear camera, the rear camera is in an active state, and draw a black pattern in the drawing area based on recognizing that, of the front camera and the rear camera, the front camera is in an active state.

Advantageous Effects of Invention

According to various embodiments, in an electronic device, it is possible to improve the quality of an image by using the periphery of a light passing area as a light blocking area to block light emitted from the display from flowing into the lens of the camera arranged below the display. In addition, in the electronic device, it is possible to use the periphery of the light passing area for various purposes (e.g., for notification and as an iris) in addition to blocking light.

MODE FOR THE INVENTION

Figure 1:
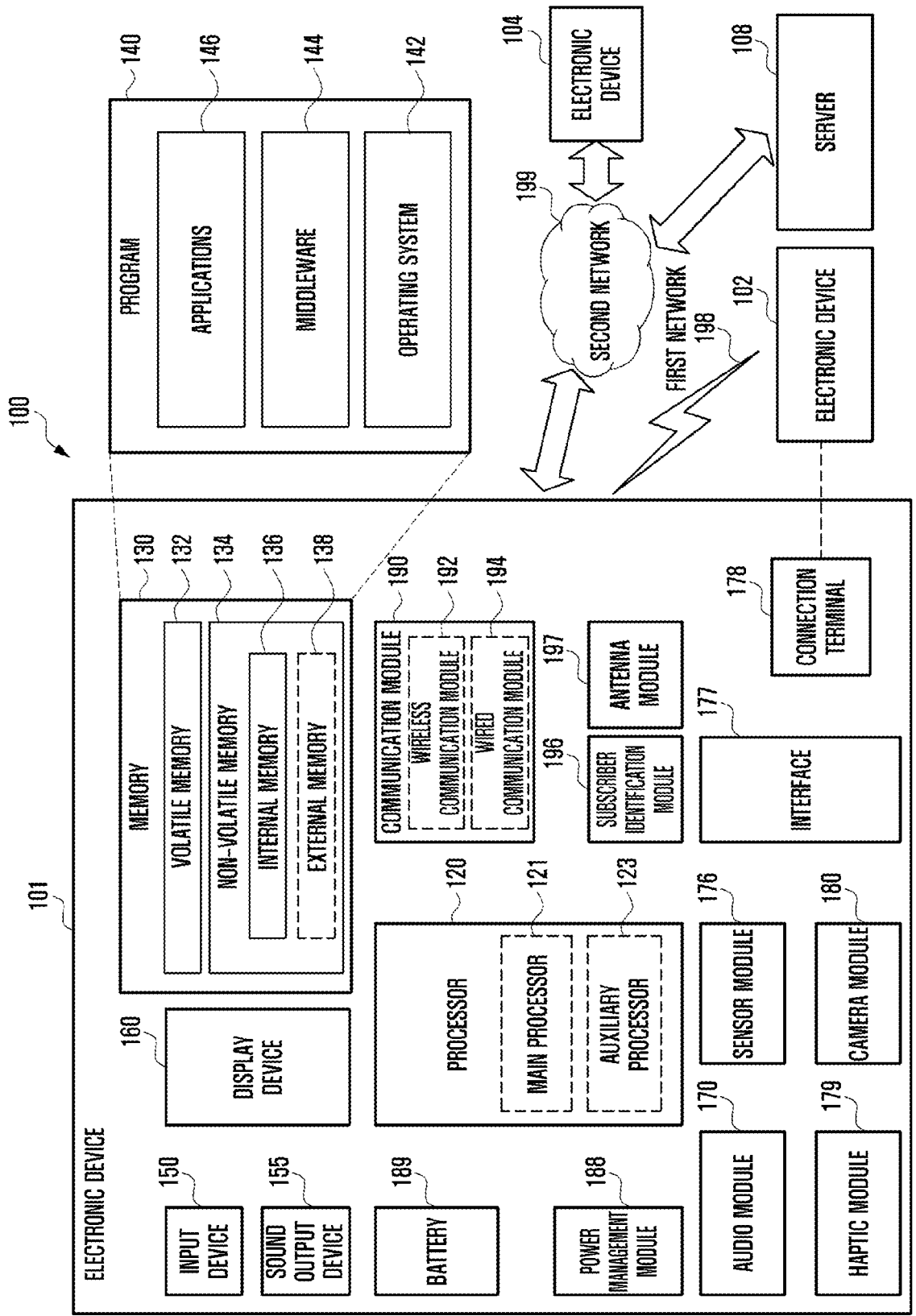
FIG. 1 is a block diagram of an electronic device according to various embodiments in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
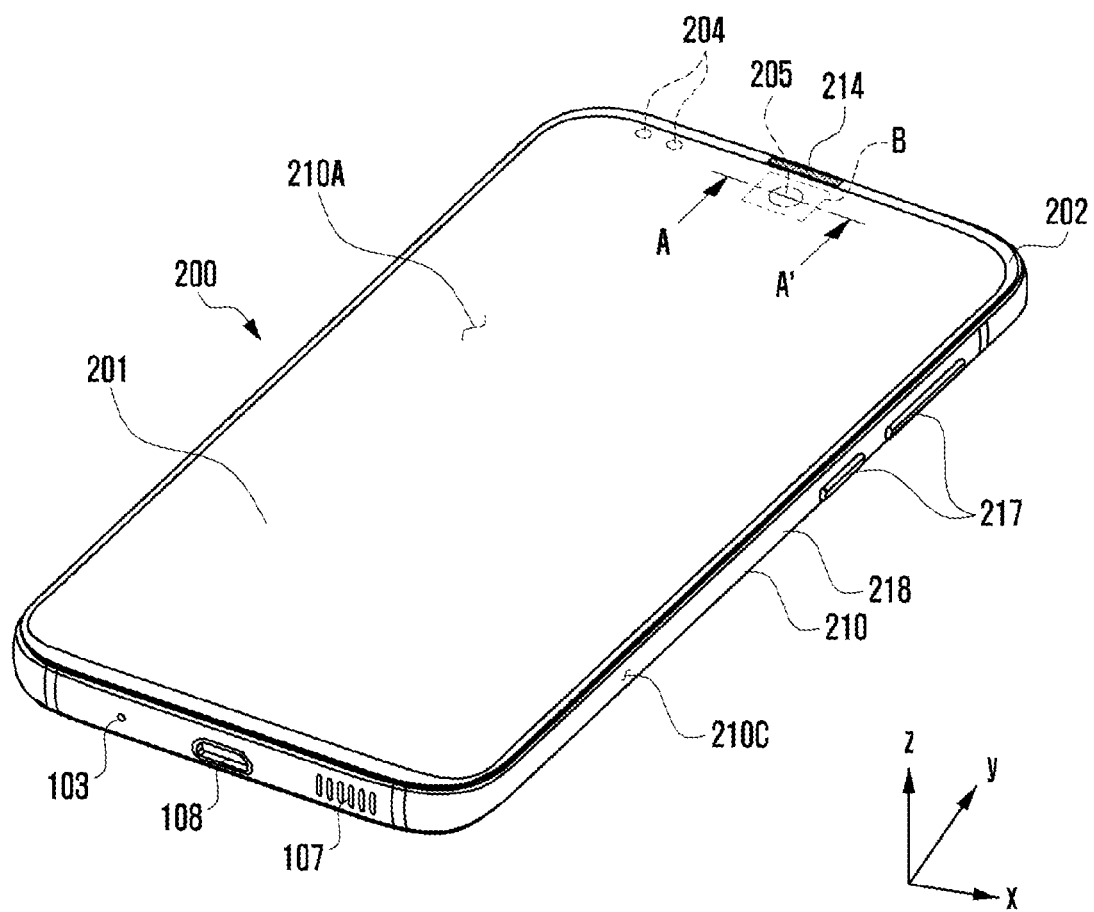
FIG. 2A is a front perspective view of an electronic device according to various embodiments of the disclosure.
Figure 2B:
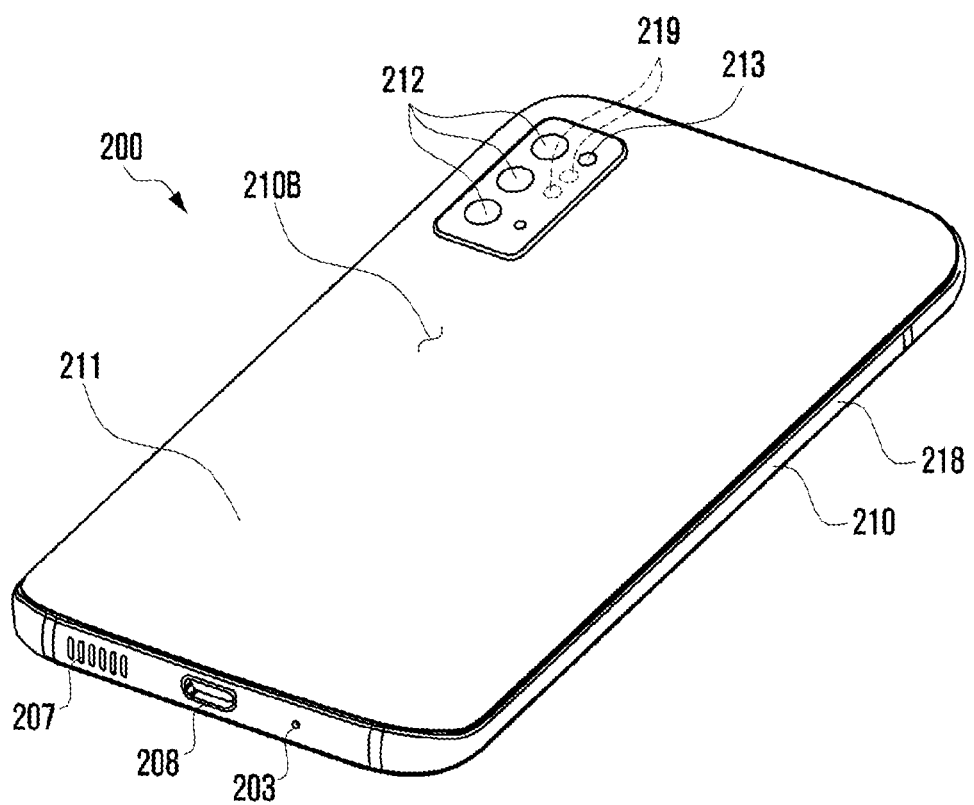
FIG. 2B is a rear perspective view of the electronic device of FIG. 2A.

FIG. 2A is a front perspective view of an electronic device 200 according to various embodiments of the disclosure. FIG. 2B is a rear perspective view of the electronic device 200 of FIG. 2A.

Referring to FIGS. 2A and 2B, the electronic device 200 (e.g., the electronic device 101 in FIG. 1) according to an embodiment may include a housing 210 including a first surface (or a front surface) 210A, a second surface (or a rear surface) 210B, and a side surface 210C surrounding a space between the first surface 210A and the second surface 210B. In another embodiment (not illustrated), the term "housing" may refer to a structure defining a part of the first surface 210A, the second surface 210B, and the side surface 210C in FIG. 2A. According to an embodiment, at least a portion of the first surface 210A may be defined by a substantially transparent front plate 202 (e.g., a glass plate or a polymer plate including various coating layers). The second surface 210B may be defined by a substantially opaque rear plate 211. The side surface 210C may be defined by a side bezel structure 218 (or a "side member") coupled to the front plate 202 and the rear plate 211 and including a metal and/or a polymer.

According to an embodiment, the electronic device 200 may include at least one of a display 201, an input device 203, sound output devices 207 and 214, sensor modules 204 and 219, camera modules 205, 212, and 213, key input devices 217, and connectors 208 and 209. In some embodiments, in the electronic device 200, at least one of the components (e.g., the key input devices 217) may be omitted, or other components may be additionally included.

The display 201 (e.g., the display device 160 in FIG. 1) may be exposed through the front plate 202. The display 201 may be coupled to or arranged adjacent to a touch-sensitive circuit, a pressure sensor capable of measuring touch intensity (pressure), and/or a digitizer configured to detect a magnetic field-type stylus pen.

In this document, the surface on which a display (e.g., a main display) is disposed may be defined as a front surface of the electronic device, and the surface opposite to the front surface may be defined as a rear surface of the electronic device. In some embodiments, a separate display (e.g., an auxiliary display) may be disposed on the rear surface. Accordingly, the display disposed on the front surface may be referred to as a front display, and the display disposed on the rear surface may be referred to as a rear display. For example, although not illustrated, the electronic device (e.g., the electronic device 101 in FIG. 1) may be a portable electronic device having a folding axis and a foldable housing that is foldable and unfoldable around the folding axis. The foldable housing may be divided into two housings about the folding axis. A first portion of a front display (e.g., a flexible display) may be disposed on the front surface of the first housing, a second portion of the display may be disposed on the front surface of the second housing, and in the folded state of the portable electronic device, the first portion and the second portion may face each other. A second display may be disposed on the rear surface of the first housing and/or the rear surface of the second housing.

The sensor modules 204 and 219 (e.g., the sensor module 176 of FIG. 1) may generate an electrical signal or data in response to an internal operating state or an external environmental state of the electronic device 200. In an embodiment, the sensor modules 204 and 219 may include a first sensor module 204 (e.g., a proximity sensor and/or a fingerprint sensor) arranged on the first surface 110A of the housing 210, and/or a second sensor module 219 (e.g., an HRM sensor) arranged on the second surface 210B of the housing 210. The first sensor module 204 may be arranged below the display 101 when the display 201 is viewed from above the first surface 210A.

The camera modules 205, 212, and 213 (e.g., the camera module 180 in FIG. 1) may include a front camera 205 disposed on the first surface 210A of the electronic device 200, a rear camera 212 disposed on the second surface 210B, and a flash 213. The cameras 205 and 212 may include a lens assembly (including one or more lenses), an image sensor, and/or an image signal processor. The flash 213 may include, for example, a light-emitting diode or a xenon lamp. According to some embodiments, two or more lenses (e.g., a wide-angle lens, a super-wide-angle lens, or a telephoto lens) and image sensors may be arranged on one surface of the electronic device 200. In an embodiment, the front camera 105 may be arranged below the display 201 when the display 201 is viewed from above the first surface 210A. A hole (e.g., a punch hole) (or an opening) may be provided in a portion of the display 201 that faces the front camera 205.

For example, the display 201 (e.g., the display 420 in FIG. 4A to be described later) may include several layers, and through holes (e.g., punch holes) may be provided in all layers. As another example, through holes may be provided in the remaining layers except for at least one layer (e.g., the display panel 431 in FIG. 4A) in the display 201. At least a part (e.g., a lens) of the front camera 205 may be disposed in the inner space in a hole punched in the display 201. Although not illustrated, in some embodiments, a plurality of front cameras 105 may be arranged below the display 201. As described above, the electronic device (e.g., the electronic device 101 in FIG. 1) may include a rear display. Accordingly, the rear camera may also be arranged below the rear display.

Figure 3:
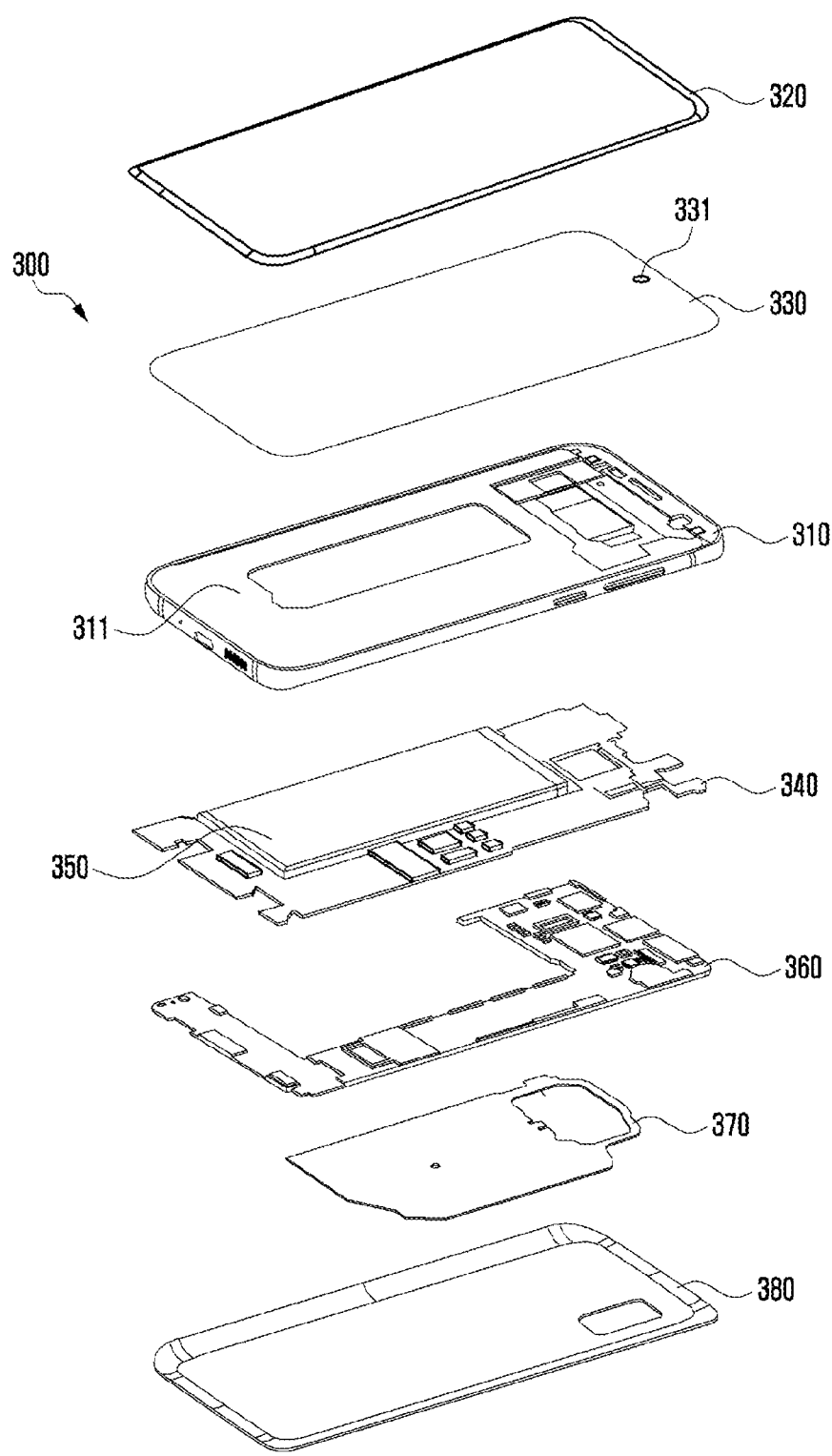
FIG. 3 is an exploded perspective view of the electronic device according to various embodiments of the disclosure.

FIG. 3 is an exploded perspective view of the electronic device 300 according to various embodiments of the disclosure. The electronic device 300 of FIG. 3 may be at least partially similar to the electronic device 200 of FIGS. 2A and 2B, or may include different components.

Referring to FIG. 3, the electronic device 300 (e.g., the electronic device 101 in FIG. 1) may include a side member 310 (e.g., a side bezel structure), a first support member 311 (e.g., a bracket or a support structure), a front plate 320 (e.g., a front cover), a display 330, a printed circuit board 340, a battery 350, a second support member 360 (e.g., a rear case), an antenna 370, and a rear plate 380 (e.g., the rear cover). In an embodiment, a camera (e.g., camera 205 in FIG. 2A) may be arranged below the display 330. A through hole 331 may be provided in a portion of the display 330 that faces the camera, as illustrated. In some embodiments, in the electronic device 300, at least one of the components (e.g., the first support member 311 or the second support member 360) may be omitted, or other components may be additionally included. At least one of the components of the electronic device 300 may be the same as or similar to at least one of the components of the electronic device 200 of FIG. 2A or FIG. 2B, and a redundant description will be omitted below.

The first support member 311 may be disposed inside the electronic device 300 and may be connected to the side member 310, or may be integrated with the side member 310. The first support member 311 may be formed of, for example, a metal material and/or a non-metal material (e.g., a polymer). The first support member 311 may include one surface to which the display 330 is coupled and the other surface to which the printed circuit board 340 is coupled. A processor (e.g., the processor 120 in FIG. 1), a memory (e.g., the memory 130 in FIG. 1), and/or an interface (e.g., the interface 177 in FIG. 1) may be mounted on the printed circuit board 340.

At least a portion of the battery 350 (e.g., the battery 189 in FIG. 1) may be disposed to be substantially coplanar with, for example, the printed circuit board 340. The battery 350 may be integrally arranged inside the electronic device 300. In another embodiment, the battery 350 may be disposed to be detachable from/attachable to the electronic device 300.

The antenna 370 (e.g., the antenna module 197 in FIG. 1) may be disposed between the rear plate 380 and the battery 350. The antenna 370 may include, for example, a near-field communication (NFC) antenna, a wireless charging antenna, and/or a magnetic secure transmission (MST) antenna. The antenna 370 is capable of performing short-range communication with an external device or transmitting/receiving power required for charging to/from an external device in a wireless manner. In another embodiment, an antenna structure may be configured with a portion the side bezel structure 310 and/or a portion of the first support member 311, or a combination thereof.

Figure 4A:
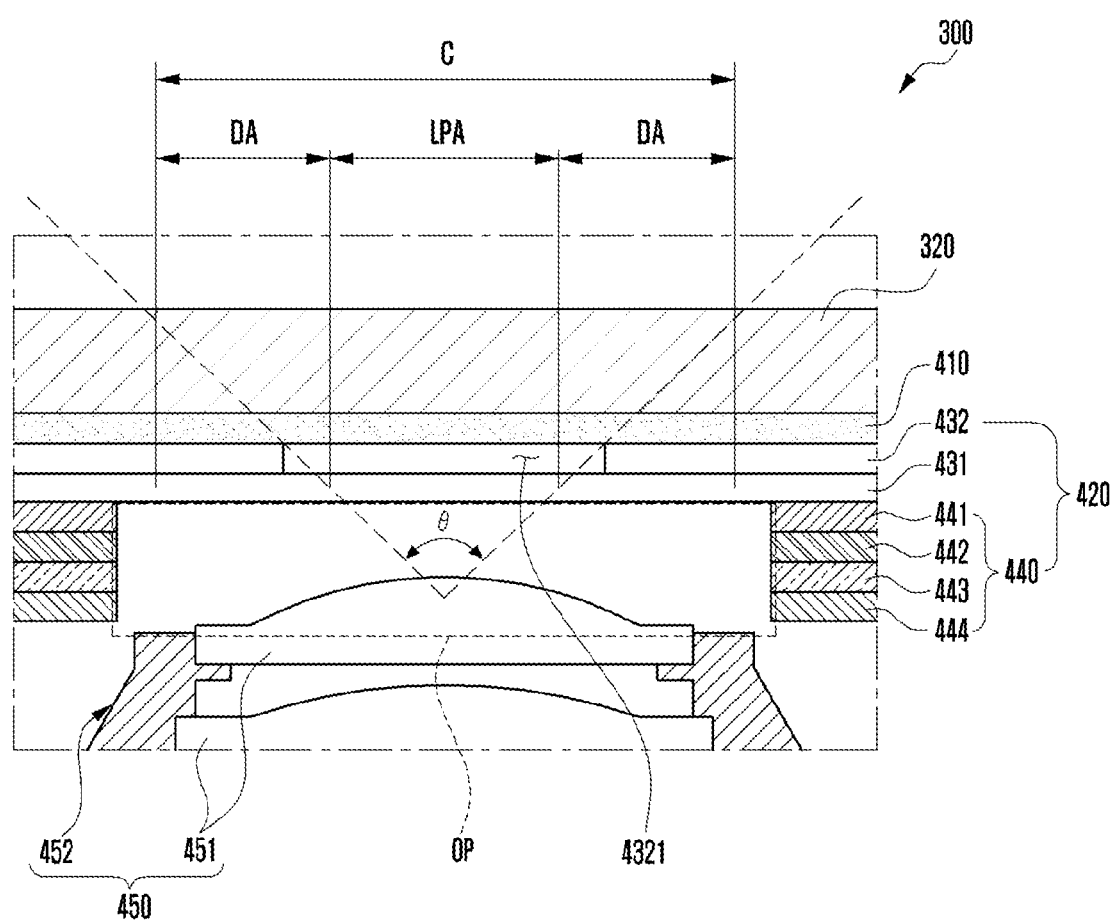
FIG. 4A is a partial cross-sectional view of the electronic device taken along line A-A' of FIG. 2A.
Figure 4B:
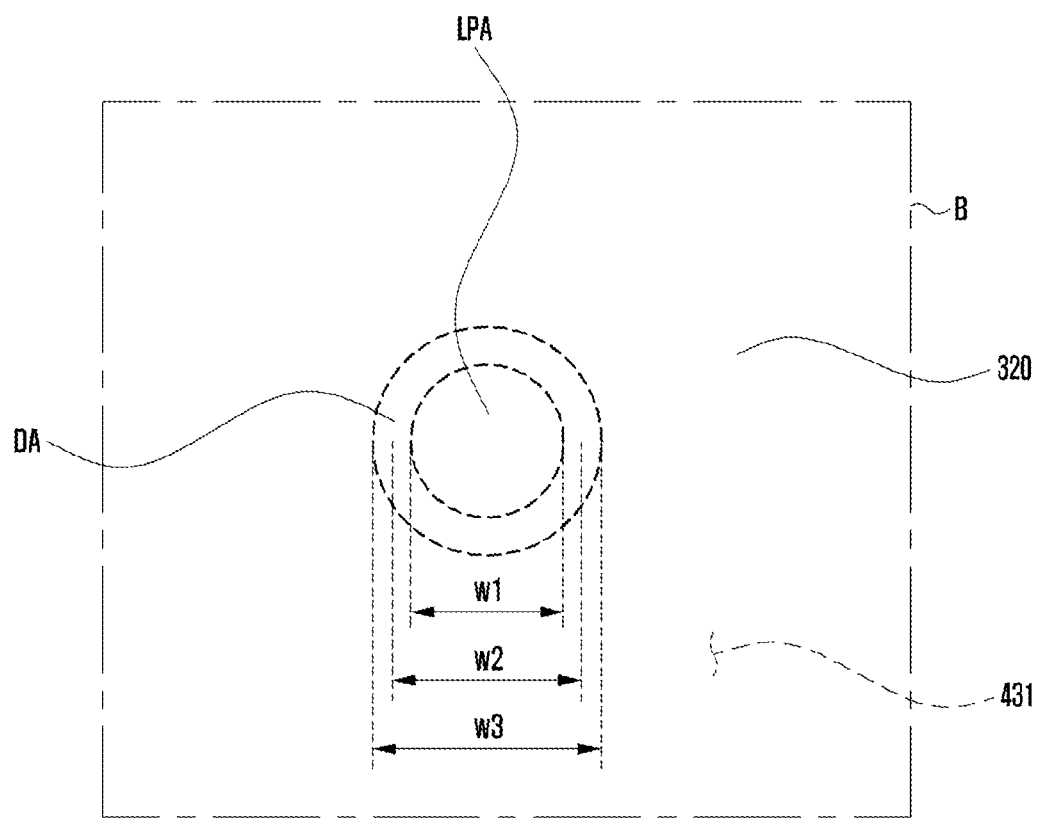
FIG. 4B is an enlarged view of an area B of FIG. 2A.

FIG. 4A is a partial cross-sectional view of the electronic device taken along line A-A' of FIG. 2A. FIG. 4B is an enlarged view of an area B of FIG. 2A.

Referring to FIGS. 4A and 4B, the electronic device 300 may include an adhesive layer 410 provided on the rear surface of the front cover 320, a display 420 attached to the adhesive layer 410, and a camera 450 arranged below the display 420. The display 420 may include a polarizer (POL) 432 (e.g., a polarizing film), a display panel 431, and an auxiliary material layer 440. According to an embodiment, the auxiliary material layer 440 may include, for example, a polymer member 441, 442 disposed on the rear surface of the display panel 431, a functional member 443 disposed on the rear surface of the polymer member 441, 442, and a conductive member 444 disposed on a rear surface of the functional member 443. The polymer member 441, 442 may include a light shielding layer 441 (e.g., a black layer including an uneven pattern) for removing air bubbles that may be generated between the display panel 431 and its lower attachments and blocking light generated by the display panel 431 or light incident from the outside and/or a buffer layer 442 disposed for shock mitigation. The functional member 443 may include a heat dissipation sheet (e.g., a graphite sheet) for dissipating heat and/or a sponge. The conductive member 444, which is a metal plate, may help to reinforce rigidity of the electronic device 300, and may be used to block ambient noise and diffuse heat emitted from surrounding heat dissipating components. In an embodiment, when the front plate 320 is viewed from the front, the POL 432 may include an opening 4321 provided to improve optical transmittance of a camera (e.g., the front camera 205 in FIG. 2A). In another embodiment, the adhesive member 410 provided on the POL 432 may also be at least partially omitted in a portion corresponding to the opening 4321. In another embodiment, the opening 4321 provided in the POL 432 may be filled with a material for tuning a refractive index depending on an increase in interfacial reflection.

According to an embodiment, the portion of the POL 432 corresponding to the lens assembly 451 may be configured to have a high transmittance, rather than being provided with the opening 4321. For example, at least a partial area of the POL 432 (e.g., an area corresponding to the lens assembly 451) may be formed of a material having a transmittance different from that of the other areas of the POL 432, or may be configured with another member capable of increasing the transmittance. According to an embodiment, a member (not illustrated) for increasing the transmittance may be disposed on at least a portion (e.g., an upper side or a lower side) of a place corresponding to the lens assembly 451 in the POL 432. According to an embodiment, the auxiliary material layer 440 may include an opening OP provided in an area that is at least partially overlaps the lens assembly 451 disposed inside the lens housing 452 when the front cover 320 is viewed from above. According to an embodiment, the opening OP provided in the auxiliary material layer 440 may be made as a single opening OP in a manner of overlapping the opening provided in the light shielding layer 441, the opening provided in the buffer layer 442, the opening provided in the functional member 443, and the opening provided in the conductive member 444. According to an embodiment, each of the openings may have different sizes to correspond to the shape of the camera module.

The display 420 may include a light passing area (LPA) corresponding to an area overlapping the effective diameter of the lens assembly 451 and a drawing area (DA) (e.g., a light blocking area, a filtering area, or a notification area) surrounding the LPA. According to an embodiment, the entire outer diameter C may correspond to the light passing area LPA and the drawing area DA. According to an embodiment, the size of the light passing area LPA or the drawing area DA may be determined by the size, arrangement, and/or location of the lens assembly 451. According to an embodiment, the size (e.g., the diameter) of the light passing area LPA may be determined based on a preset angle of view θ of the lens assembly 451. According to an embodiment, the size of the drawing area DA (e.g., the width between the inner diameter and the outer diameter) may be determined as a size that is capable of blocking light (e.g., the light emitted from the display panel 431 and reflected from the front cover 320) such that the light does not flow into the opening OP. According to an embodiment, the light passing area LPA may be configured as an opening, through which at least a part of light from the outside of the electronic device 300 may be introduced and transmitted to an image sensor of the camera 450 via the lens assembly 451.

In an embodiment, the electronic device (e.g., the electronic device 101 of FIG. 1) may further include one or more light passing areas and drawing areas. For example, although not illustrated, a second front camera may be further arranged below the display 420. Accordingly, the display 420 may include a second light passing area LPA2 and a second drawing area DA2 corresponding to the second front camera. In an embodiment, the electronic device may include a rear display and a rear camera disposed below the rear display. Accordingly, in the rear display, the portion corresponding to the rear camera may be designated as a third light passing area LPA3 and a third drawing area DA3.

In an embodiment, the light passing area LPA of the display panel 431 may be configured as an area in which pixels and/or wires are not disposed in order to improve light transmittance, rather than being configured as an opening. In an embodiment, the light passing area LPA of the display panel 431 may be configured to have a lower pixel density and/or a lower wiring density than the periphery thereof in order to improve the light transmittance.

Figure 5:
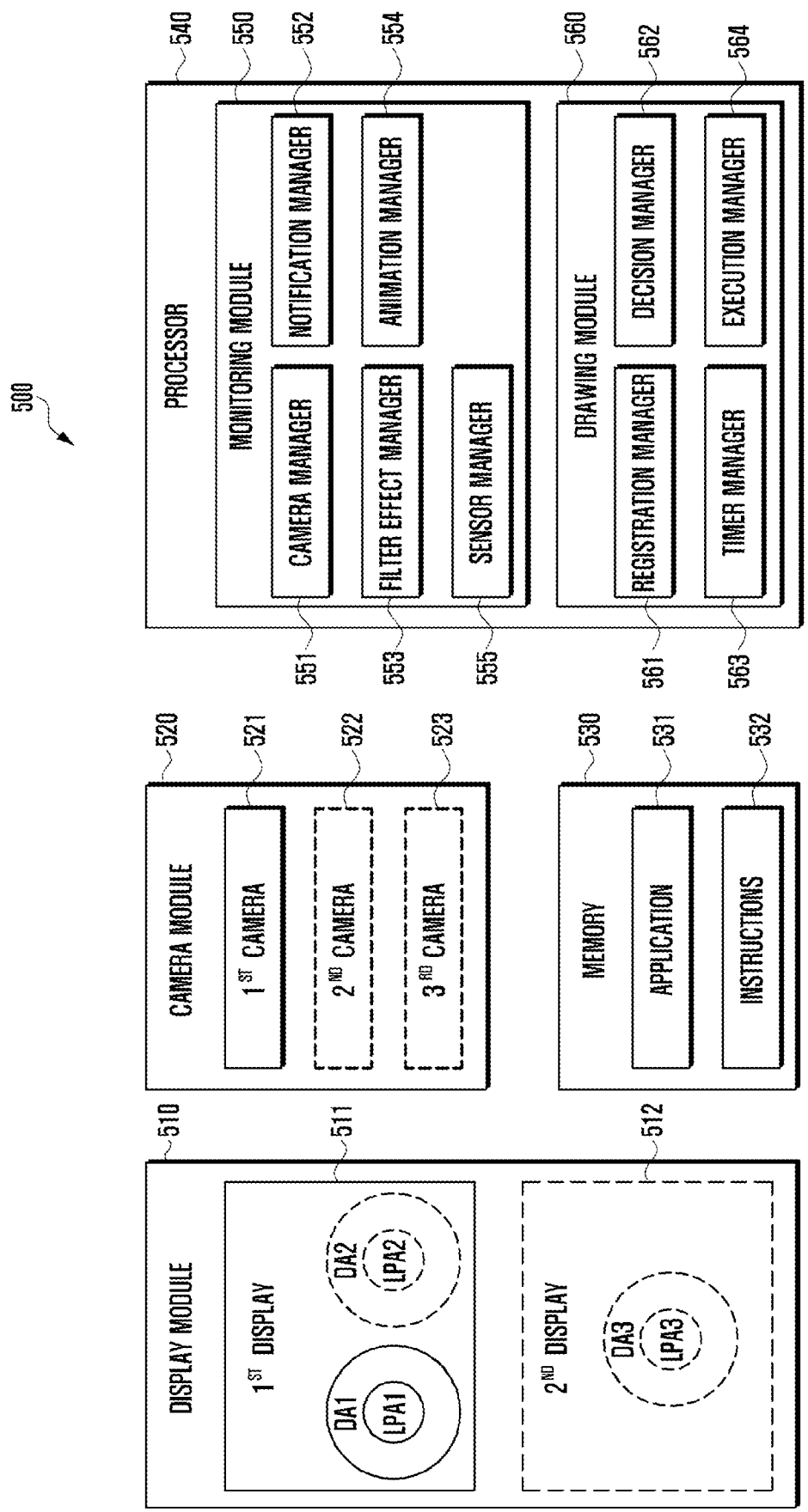
FIG. 5 is a block diagram of an electronic device 500 configured to draw a pattern in the periphery of a light passing area of a display according to various embodiments.

FIG. 5 is a block diagram of an electronic device 500 configured to draw a pattern in the periphery of the light passing area of the display (e.g., the drawing area DA in FIGS. 4A and 4B) according to various embodiments. Configurations overlapping those of FIGS. 1 to 4 are omitted or briefly described. Referring to FIG. 5, an electronic device 500 (e.g., the electronic device 101 in FIG. 1) may include a display module 510, a camera module 520, a memory 530, and a processor 540.

The display module 510 (e.g., the display device 160 in FIG. 1) may include one or more displays. In an embodiment, the display module 510 may include a first display 511 (e.g., the display 201 in FIGS. 2A and 2B) disposed on the front surface of the electronic device 500. In another embodiment, the display module 510 may further include a second display 512 disposed on the rear surface of the electronic device 500.

The camera module 520 (e.g., the camera module 180 in FIG. 1) may include one or more cameras. In an embodiment, the camera module 520 may include a first camera 521 (e.g., the front camera 205 in FIG. 2A) arranged below the first display 511. In the first display 511, a portion corresponding to the first camera 521 may be designated as a first light passing area LPA1 (e.g., the LPA in FIGS. 4A and 4B) and a first drawing area DA1 (e.g., the DA in FIGS. 4A and 4B). In another embodiment, the camera module 520 may further include at least one second camera 522 arranged below the first display 511. In the first display 511, a portion corresponding to the second camera 522 may be designated as a second light passing area LPA2 and a second drawing area DA2. In another embodiment, the camera module 520 may further include at least one third camera 523. For example, the third camera 523 may be a camera disposed on the rear surface of the electronic device 500 (e.g., the rear camera 212 in FIG. 2B). The third camera 523 may include an array camera having a plurality of lenses arranged in a grid form on the rear surface when the rear surface is viewed from the rear side. As another example, the third camera 523 may be arranged below the second display 512. In this case, in the second display 512, a portion corresponding to the third camera 523 may be designated as a third light passing area LPA3 and a third drawing area DA3.

The memory 530 (e.g., the memory 130 of FIG. 1) may store an application 531 (e.g., the application 146 in FIG. 1) (or a service), and instructions 532 for causing the processor 540 to perform a drawing operation based on the execution of the application 531. In an embodiment, the drawing operation may include an operation that determines attributes (e.g., the size of a pattern, a pattern color, a drawing time, and/or a drawing period) of a drawing area (e.g., DA1, DA2, and/or DA3) and/or an operation of drawing a pattern (e.g., a ring-shaped pattern) in the drawing area based on the determined attributes. An application 531 that triggers the drawing operation includes a camera application, a clock (e.g., an alarm or a timer) application, a message application, a call application, a health (e.g., biometric information such as exercise amount or blood sugar) application, a home application, a media player application, and/or an environmental information (e.g., barometric pressure, humidity, or temperature) application.

The processor 540 (e.g., the processor 120 in FIG. 1) may be configured to perform a drawing operation based on the execution of the application 531. In an embodiment, the processor 540 may recognize a camera-related request from the application 531 and/or an application manager (e.g., the middleware 144 in FIG. 1). In response to the request, the processor 540 may make the drawing area appear black by inactivating pixels located in the drawing area (or setting the pixels to a pixel value corresponding to a black series) such that the pixels do not emit light. That is, the processor 540 may use the drawing area as a light blocking area by drawing a black pattern in the drawing area. In an embodiment, the application manager may provide various functions to the application such that the application 531 is able to use a function or information provided from one or more resources (e.g., the display module 510 or the camera module 520) of the electronic device 500. For example, the processor 540 may recognize that the application 531 (or its manager) requests activation of the first camera 521 or requests use of its function (e.g., preview or photography), and in response to such requests, the processor 540 may draw a black pattern in the DA1 so that the light of the first display 511 can be blocked from flowing into the first camera 521. In response to the same request (e.g., activation or use of a function) of the application 531 (or its manager) for other cameras (522 and/or 523) as well, the processor 540 may draw a pattern of black color in the corresponding drawing area (the DA2 and/or the DA3). The processor 540 may identify that the application 531 (or its manager) request inactivation of a camera (at least one of the first camera 521, the second camera 522, and the third camera 523) or requests to stop using the function of the camera, and in response to this request, the processor 540 may stop drawing the black pattern in the corresponding drawing area.

In an embodiment, the processor 540 may recognize that the application 531 (or its manager) requests an optical effect as a setting (or option) for a function (e.g., preview or photography), and in response to this request, the processor 540 may adjust the attributes of a drawing area (an area(s) corresponding to the camera(s) activated for photography among the DA1, DA2, and DA3) to use the drawing area as a filtering area. The optical effect may include a vignette effect that darkens an edge of an image to be photographed. The processor 540 may give an optical effect to an image to be photographed by adjusting the size and/or color of the pattern such that light flows into the lens through the drawing area. For example, the processor 540 may enable light to enter the lens through at least a portion of the drawing area by making the outer diameter of the pattern to be drawn in the drawing area match the outer diameter of the drawing area and setting the inner diameter of the pattern to be wider than the inner diameter of the drawing area (referring to FIG. 4B, for example, widening the inner diameter of the pattern from "w1" to "w2"). As another example, the processor 540 may enable light to enter the lens through at least a portion of the drawing area by making the inner diameter of the pattern to be drawn in the drawing area match the inner diameter of the drawing area and setting the outer diameter of the pattern to be narrower than the outer diameter of the drawing area (referring to FIG. 4B, for example, narrowing the outer diameter of the pattern from "w3" to "w2"). The processor 540 may enable light to enter the lens through the drawing area by drawing a pattern over the entire drawing area in the same way as when drawing the black pattern but by making the color lighter (e.g., by drawing a gray pattern).

In an embodiment, the processor 540 may recognize a notification-related request from the application 531 (or its manager). The processor 540 may use the drawing area as a notification area by drawing a moving pattern in the drawing area in response to such a request. Notification may be a function for notifying a user that there is, for example, message reception (e.g., message reception from an external device via the communication module 190), time alarm, timer termination, call reception (e.g., call reception from an external device via the communication module 190), or a measurement result (e.g., biometric information or environmental information obtained by using the sensor module 176). In response to the request, the processor 540 may notify the user that there is a notification content to be identified by the user by flicking a predetermined color (e.g., white) in the drawing area (at least one of the DA1, the DA2, or the DA3) for a predetermined time or sequentially and repeatedly drawing several colors for a predetermined time in the drawing area. As another example, the processor 540 may draw a specific color in the drawing area and continuously change its attributes (e.g., saturation and/or brightness) for a predetermined period of time.

In an embodiment, the processor 540 may perform a drawing operation based on execution of a timer for photographing. For example, the processor 540 may recognize the start of the photo timer through a camera application or its manager, and may notify the user via the drawing area that photographing will start soon by drawing a moving pattern (e.g., a blinking pattern, a color change pattern, or a color attribute change pattern) in a drawing area (an area(s) corresponding to the camera(s) activated for photographing among the drawing areas the DA1, the DA2, and the DA3) in response to the start of the photographing timer. The processor 540 may recognize the termination of the photographing timer via the camera application or its manager, and may draw a black pattern in the drawing area in response to the termination of the photographing timer. As another example, the processor 540 may display an animation effect that is completed in a black pattern as the photographing timer approaches the termination (in other words, as the photographing time approaches) via the drawing area. For example, the processor 540 may set the brightness of the pattern to be drawn in the drawing area to be bright close to white when the photographing timer starts, and may set the brightness of the pattern to be dark close to black as the photographing timer approaches the termination. As another example, the processor 540 may set the blinking interval of a specific color (e.g., black) to become shorter as the photographing timer approaches termination. The processor 540 may stop blinking at the start of photographing and may draw a black pattern in the drawing area during photographing. As another example, the processor 540 may block light from entering the lens through the drawing area from the time of photographing by gradually narrowing the inner diameter of the black pattern as the photographing timer approaches termination.

In an embodiment, the processor 540 may recognize that a media (e.g., music) is played via a media player or its manager, and in response to media playback, the processor 540 may display an animation effect corresponding to the sound via the drawing area (e.g., the area corresponding to the array camera).

In an embodiment, the processor 540 may use the drawing area as a portion (e.g., the pupil of the character) of the background (e.g., theme) of a home screen based on the execution of the home application.

The processor 540 may draw a predetermined pattern (e.g., a black pattern) in the drawing area corresponding to an active (or photographing) camera, and may use the drawing area corresponding to an inactive (or waiting for photographing) camera as an area to display image information (e.g., an area for previewing a photographed image). Accordingly, the user may identify which camera is an active (or photographing) camera through the presence or absence of the pattern.

The processor 540 may be configured to perform a drawing operation based on a user input. In an embodiment, the processor 540 may draw a black pattern in a drawing area (e.g., the area corresponding to a display that displays a preview image among the DA1, DA2, and DA3) in response to a user input for execution of a camera application (e.g., two consecutive pushes on the key input device 217, or a touch input of the user on a camera icon displayed on a touch-sensitive display (e.g., the first display 511)).

In an embodiment, the processor 540 may select a drawing area in which a black pattern is to be drawn based on a user input for selecting a camera to use. For example, while the preview image photographed by a rear camera (e.g., the third camera 523) is displayed on the first display 511, the processor 540 may receive, from the first display 511, a user input (e.g., a flick gesture) for changing the camera to be used to the front camera (e.g., the first camera 521 and/or the second camera 522). The processor 540 may draw a black pattern in a drawing area (e.g., the DA1 and/or the DA2) corresponding to the selected camera.

In an embodiment, the processor 540 may include a monitoring module 550 configured to observe the execution state of the application 531 and a drawing module 560 configured to draw a pattern in a drawing area based on the observation result. In an embodiment, at least one of the modules 550 and 560 may be configured in the electronic device 500 as hardware different from the processor 540. In an embodiment, at least one of the modules 550 and 560 may be software (e.g., instructions 532) stored in the memory 530, and the processor 540 may execute the software to perform a drawing operation.

The monitoring module 550 may recognize that the application 531 intends to use a resource (e.g., a function provided by the display module 510 or the camera module 520) of the electronic device 500, and may transmit information for drawing corresponding to the resource to be used by the application 531 to the drawing module 560. In an embodiment, the monitoring module 550 may recognize that an application registered by the drawing module 560 as triggering a drawing operation intends to use a resource, and accordingly may transmit drawing information corresponding to the resource to the drawing module 560, for example, in the form of a callback message. For example, the drawing information may indicate an application that triggered the drawing operation (e.g., an application package name), a place where a pattern is to be drawn among the DA1, DA2, and DA3 (a drawing area), the size of the pattern, the color of the pattern, the drawing time, the drawing period, or presence or absence of an animation effect, or the type of animation effect (e.g., blinking, color change, brightness change, or saturation change).

In an embodiment, the monitoring module 550 may include a camera manager 551, a notification manager 552, a filter effect manager 553, an animation manager 554, and a sensor manager 555. The camera manager 551 may recognize that the camera application intends to use a function (e.g., preview or photographing) of a camera (e.g., the first camera 521), and may transmit drawing information corresponding to the recognized function to the drawing module 560. The notification manager 552 may recognize that a specific application (e.g., a clock application, a message application, or a call application) intends to notify the user of a specific event (e.g., time alarm, message reception, or call reception) by using a display (e.g., the first display 511), and may transmit drawing information corresponding to the recognized notification to the drawing module 560. The filter effect manager 553 may recognize that the camera application intends to use an optical effect (e.g., a vignette effect) as an option for a camera function, and may transmit drawing information corresponding to the recognized option to the drawing module 560. The animation manager 554 may recognize that the application intends to use an animation effect, and may transmit drawing information corresponding to the recognized animation effect to the drawing module 560. For example, as the camera application requests use of a camera function (e.g., photographing), the animation manager 554 may transmit drawing information for animating an animation effect in the drawing area to the drawing module 560. The animation manager 554 may recognize that the media player executes media playback, and accordingly, may transmit drawing information for animating an animation effect corresponding to sound to be output through the speaker to the drawing module 560. The sensor manager 555 may recognize that a health or environment information application intends to use a resource (e.g., a display) to inform the user of a measurement result, and may transmit drawing information corresponding to the recognized function to the drawing module 560.

The drawing module 560 may be configured to: register an application that triggers a drawing operation in the monitoring module 550; receive drawing information corresponding to the execution state of the registered application from the monitoring module 550; and perform a drawing operation based on the received drawing information.

In an embodiment, the drawing module 560 may include a registration manager 561, a decision manager 562, a timer manager 563, and a drawing manager 564. The registration manager 561 may register a list of applications to trigger a drawing operation in the monitoring module 550. For example, the registration manager 561 may register the application 531 in a callback function (e.g., camera status callback) so that the monitoring module 550 observes the execution state of the application 531 and outputs the execution state to the drawing module 560. The registration manager 561 may receive drawing information from the monitoring module 550 as a reply (e.g., a callback message) according to registration, and may transmit the drawing information to the decision manager 562 and/or the timer manager 563. The decision manager 562 may determine, based on the received drawing information, a place where a pattern is to be drawn (a drawing area) among the DA1, DA2, and DA3, the size of the pattern, the color of the pattern, whether to provide an animation effect, or the type of the animation effect. In an embodiment, for at least one of the attributes of the drawing area, the decision manager 562 may determine a predetermined value (e.g., default) regardless of whether drawing information related to the corresponding attribute is received from the monitoring module 550. For example, when the source of the drawing information is the camera manager 551, the decision manager 562 may determine the color of a pattern to be drawn in the drawing area as a predetermined black color. The timer manager 563 may determine a drawing time and/or a period (e.g., a blinking period) based on the received drawing information. The execution manager 564 may execute the drawing operation based on the decision of the decision manager 562 and/or the timer manager 563.

Figure 6:
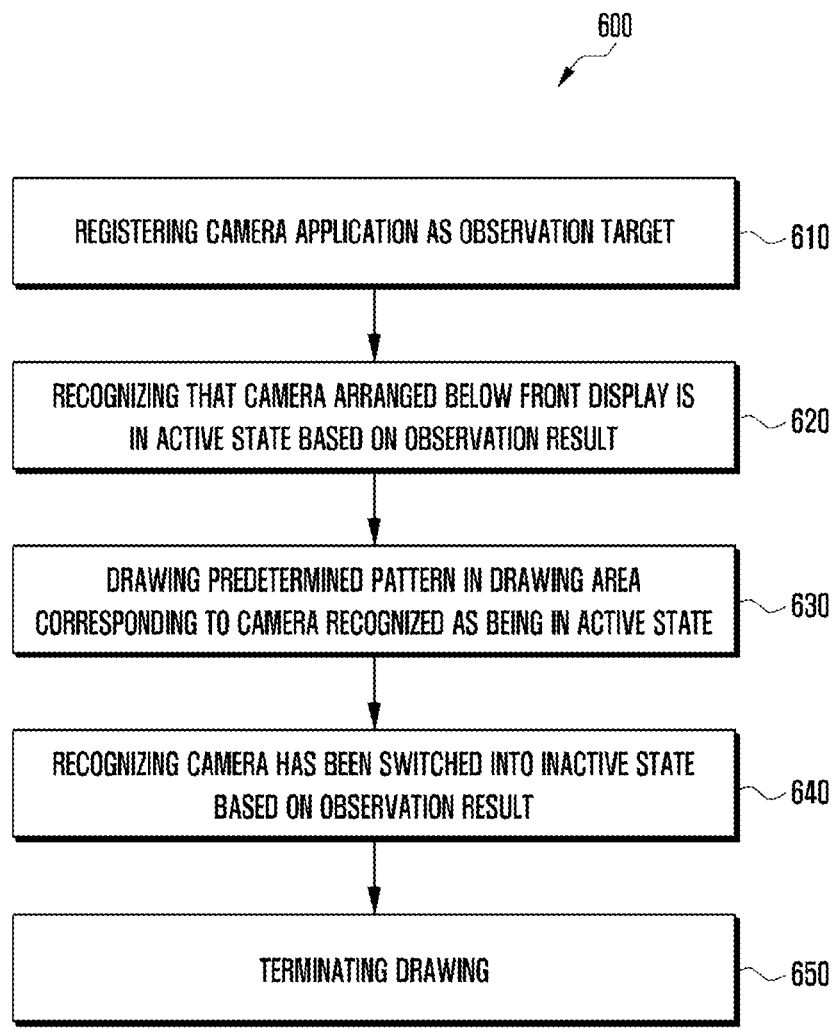
FIG. 6 is a view for explaining operations for drawing based on an execution state of a camera application according to an embodiment.

FIG. 6 is a view for explaining operations 600 for drawing based on an execution state of a camera application according to an embodiment. Referring to FIG. 6, the processor 540 may perform operations 600 by using the monitoring module 550 and the drawing module 560. For convenience, operations overlapping those described above will be briefly described.

In operation 610, the processor 540 may observe the execution state of the camera application in real time by registering the camera application as an observation target.

In operation 620, based on the observation result for the camera application, the processor 540 may recognize that a camera (e.g., the first camera 511) arranged below the front display (e.g., the first display 511) is in an active state. In an embodiment, the active state may mean a state from when the camera is powered-on or opened as the camera application is executed (or the camera application is switched from a background application to a foreground application) until the camera is powered-off or closed as execution of the camera application is terminated (or switched to a background application). In another embodiment, the active state may mean a state from when an image photographed by the camera starts to be displayed on the front display (e.g., preview) until the preview is stopped. In another embodiment, the active state may mean a state from when the photographing timer starts to operate until an image is photographed (e.g., a captured image is stored in a memory) after termination of the photographing timer. In another embodiment, the active state may mean a state from when moving image recording is started until the moving image recording is terminated. In another embodiment, the active state may mean a state from when a user input for image capture (e.g., a touch input for a displayed capture button) is generated until a predetermined time elapses. In another embodiment, the active state may mean a state from when the processor 540 starts receiving image data in frame units from the camera until reception of the image data is stopped. In another embodiment, the active state may mean a state from when the processor 540 starts image capture by using a camera until processing for image capture is completed.

In operation 630, the processor 540 may draw a predetermined pattern in a drawing area (e.g., the DA1) corresponding to the camera recognized as the active state. In an embodiment, the processor 540 may draw a black pattern in the drawing area while the camera is in the active state. In another embodiment, the processor 540 may generate an image to which an optical effect (e.g., a vignette effect) is added by adjusting the size and/or color of the pattern such that light enters the lens through the drawing area while the camera is in the active state. In another embodiment, the processor 540 may draw a moving pattern (e.g., a blinking pattern, a color change pattern, or a color attribute change pattern) in the drawing area in response to the start of the photographing timer. The processor 540 may draw a black pattern in the drawing area in response to the termination of the photographing timer. In another embodiment, the processor 540 may set the blinking interval of a specific color (e.g., black) to become shorter and shorter as the photographing timer approaches the termination, may terminate the blinking at the start of photographing, and may continuously draw a black pattern during photographing. As another example, the processor 540 may block light from entering the lens through the drawing area from the time of photographing by gradually narrowing the inner diameter of the black pattern as the photographing timer approaches termination.

In operation 640, the processor 540 may recognize that the state of the camera is switched from the active state to the inactive state, based on the observation result of the camera application.

In operation 650, the processor 540 may terminate drawing of the drawing area as the camera is switched to the inactive state. For example, the processor 540 may stop drawing the pattern according to operation 640 and use the drawing area as an area for previewing a photographed image.

Figure 7:
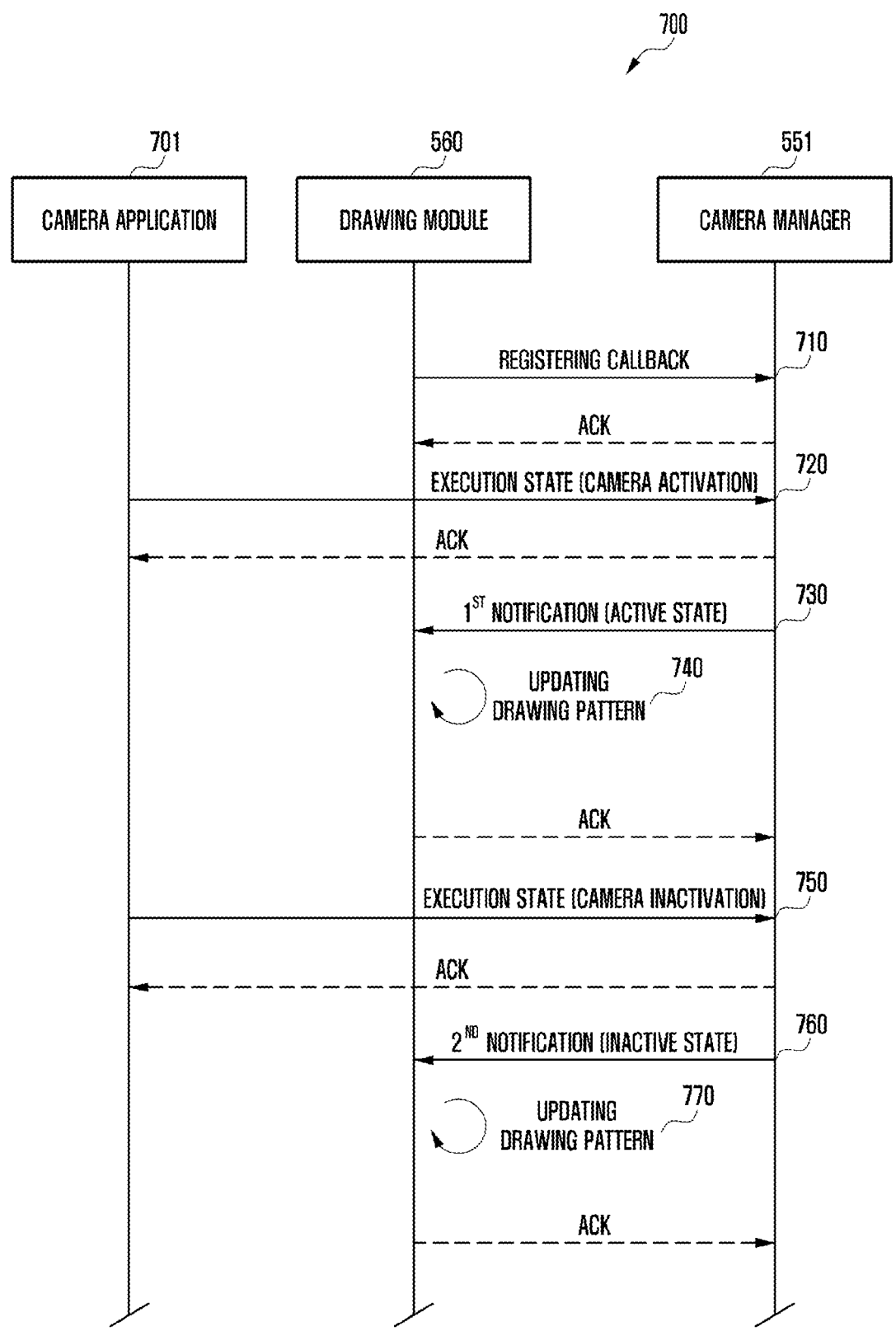
FIG. 7 is a view for explaining operations for drawing based on an execution state of a camera application according to an embodiment.

FIG. 7 is a view for explaining operations 700 for drawing based on an execution state of a camera application according to an embodiment. Operations 700 of FIG. 7 may be performed by a camera application 701, a camera manager 551 (e.g., a camera framework), and a drawing module 560. For convenience, operations overlapping those described above will be briefly described.

In operation 710, the drawing module 560 may register a callback in the camera manager 551 as a request to inform the execution state of the camera application 701. As a response to the request of the drawing module 560, the camera manager 551 may transmit a response message (e.g., acknowledgment (ACK)) to the drawing module 560.

In operation 720, the camera manager 551 may receive a message indicating the execution state of the camera application 701 from the camera application 701, and may recognize from the received massage that the camera (e.g., the first camera 511) is in an active state (e.g., the active state defined as various embodiments of FIG. 6). As a response that the message has been received, the camera manager 551 may transmit a response message (e.g., ACK) to the camera application 701.

In operation 730, the camera manager 551 may notify the drawing module 560 that the camera is in the active state (first notification). In an embodiment, the camera manager 551 may transmit, for example, drawing information (e.g., the drawing information described with reference to FIG. 5) to the drawing module 560 as information to be referenced when determining an attribute for the drawing area, along with the first notification.

In operation 740, the drawing module 560 may update the pattern of the drawing area in response to the first notification. For example, the processor 540 may draw a predetermined pattern in the drawing area (e.g., the DA1) corresponding to the camera recognized as the active state. As a response that the first notification has been received, the drawing module 560 may transmit a response message (e.g., ACK) to the camera manager 551.

In operation 750, the camera manager 551 may receive a message indicating the execution state of the camera application 701 from the camera application 701, and recognize that the camera is switched to the inactive state from the received message. As a response that the message has been received, the camera manager 551 may transmit a response message (e.g., ACK) to the camera application 701.

In operation 760, the camera manager 551 may notify the drawing module 560 that the camera has been switched to the inactive state (second notification).

In operation 770, the drawing module 560 may update the pattern of the drawing area in response to the second notification. For example, the drawing module 560 may terminate drawing according to operation 740 and use the drawing area as an area for displaying an image (e.g., a theme of a home screen or a captured image). As a response that the second notification has been received, the drawing module 560 may transmit a response message (e.g., ACK) to the camera manager 551.

Figure 8:
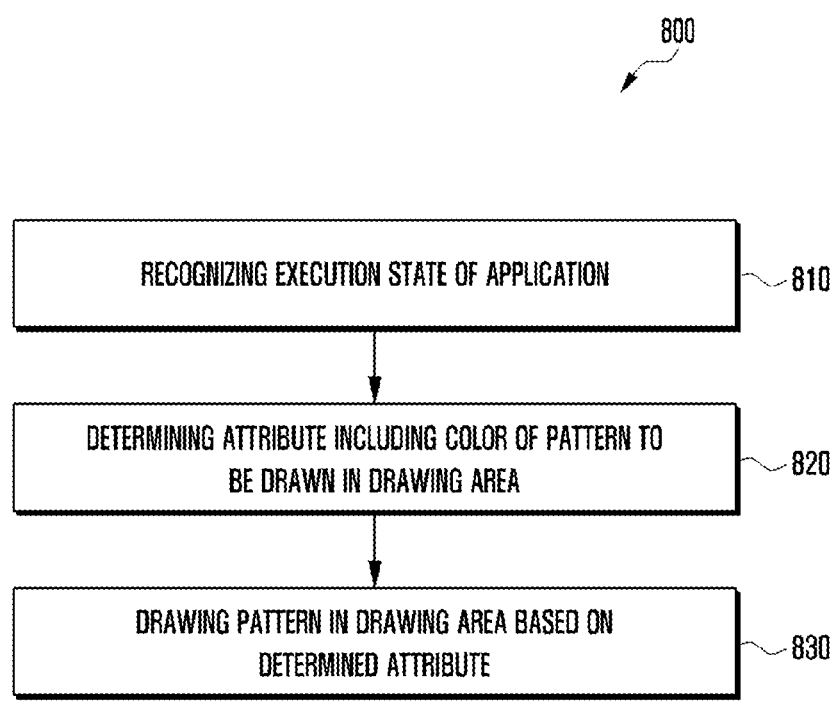
FIG. 8 is a view for explaining operations for drawing based on an execution state of an application according to an embodiment.

FIG. 8 is a view for explaining operations 800 for drawing based on an execution state of a camera application according to an embodiment. The operations 800 of FIG. 8 may be performed by a processor (e.g., the processor 540 in FIG. 5). For convenience, operations overlapping those described above will be briefly described.

In operation 810, the processor may recognize the execution state of an application that triggers the drawing operation (e.g., the application 531 in FIG. 5).

In operation 820, the processor may determine attributes of a pattern to be drawn in the drawing area (e.g., the DA1) based on the recognized execution state. For example, the attributes may indicate the size of a pattern, the color of the pattern, a drawing time, a drawing period, whether to provide an animation effect, or the type of the animation effect (e.g., blinking, color change, brightness change, or saturation change).

In operation 830, the processor may draw a pattern in the drawing area based on the determined attributes.

According to various embodiments, an electronic device may include: a display including a light passing area and a drawing area surrounding the light passing area; a first camera arranged below the light passing area when the light passing area viewed from above the display; a processor operatively coupled to the display and the first camera; and a memory operatively connected to the processor, wherein the processor may be configured to store an application in the memory, and draw a pattern in the drawing area based on an execution state of the application.

The processor may be configured to determine, as part of an operation of drawing the pattern on the drawing area, an attribute including a color of the pattern to be drawn on the drawing area, based on an execution state of the application.

The application may include a camera application, and the processor may be configured to, as an operation of drawing the pattern on the drawing area, recognize that the first camera is in an active state according to execution of the camera application, and draw a pattern including a black color in the drawing area based on recognizing that the first camera is in the active state. The activation state may indicate a state from when the first camera is powered-on until the first camera is powered-off, a state from when the processor starts receiving image data from the first camera until reception of image data from the first camera stops, a state from when the processor starts capturing an image by using the first camera until a process for the capturing is completed, a state from when the image photographed by the first camera is displayed on the display until the displaying is stopped, a state from when a photographing timer starts operating until the image photographed by the first camera is stored in the memory after termination of the timer, a state from when moving image recording is started by using the first camera until the moving image recording is terminated, or a state from when a user input for image capture is generated until a predetermined time elapses.

The processor may be configured to adjust the attribute of the pattern when recognizing that the function to be executed by using the camera application applies an optical effect to an optical effect to the image to be photographed. The processor may be configured to, as an operation of adjusting the attribute of the pattern, perform an operation of widening the inner diameter of the pattern to be wider and/or an operation of adjusting the color of the pattern to be lighter than black.

The processor may be configured to draw a moving pattern, in the drawing area in response to start of a photographing timer, and draw the black pattern in the drawing area in response to termination of the timer. The processor may be configured to, as at least part of the operation of drawing the moving pattern, perform: an operation of blinking the pattern; an operation of changing a color of the pattern to be drawn in the drawing area; or an operation of changing brightness and/or saturation while drawing a predetermined color in the drawing area. The processor may be configured to, as at least part of the operation of blinking the pattern, perform an operation of setting the blinking interval to be shorter as approaching the termination of the timer.

The application may include an application for notification, wherein the processor may be configured to, as at least part of drawing the pattern in the drawing area, draw a moving pattern in the drawing area based on the execution of the application for notification. The notification may inform a user of reception of a message or a call from an external device via a communication circuit provided in the electronic device, a time alarm, termination of a timer, or a measurement result obtained by using a sensor provided in the electronic device.

The application may include a media player, wherein the processor may be configured to, as at least a part of drawing the pattern in the drawing area, recognize that a media is being played by the media player, and display an animation effect corresponding to a sound according to the playing of the media via the drawing area.

The application may include a camera application, wherein the processor may be configured to, as an operation of drawing the pattern in the drawing area, draw a black pattern in the drawing area in response to a user input for executing the camera application.

The display may be disposed on a front surface of the electronic device, and the electronic device may further include a second camera operatively connected to the processor and disposed on a rear surface of the electronic device, wherein the processor may be configured to, as an operation of drawing the pattern in the drawing area, draw a black pattern in the drawing area in response to a user input for changing a camera to be used from the second camera to the first camera.

The light-transmitting area may be an area provided as an opening, an area having a lower pixel density than other areas of the display, or an area having no pixels.

The processor may include a camera manager and a drawing module, wherein the camera manager may be configured to observe an execution state of a camera application based on a request of the drawing module, recognize that the first camera is in an active state based on the observed execution state, and notify the drawing module that the first camera is in the active state. The drawing module may be configured to draw a black pattern in the drawing area in response to the notification.

The display may further include a second light passing area and a second drawing area surrounding the second light passing area, wherein the electronic device may further include a second camera operatively coupled to the processor and arranged below the second light passing area when the second light passing area is viewed from about the display, and wherein the processor may be configured to draw a black pattern in a drawing area corresponding to a camera that is in an active state among the cameras and use the drawing area corresponding to an camera in an inactive state among the cameras as an area for displaying image information.

According to various embodiments, a portable electronic device may include: a display disposed on a front surface of the portable electronic device and including a light passing area and a drawing area surrounding the light passing area; a front camera arranged below the light passing area when the light passing area viewed from above the display; a rear camera disposed on the rear surface of the electronic device; and a processor operatively coupled to the display, the front camera, and the rear camera, wherein the processor may be configured to use the drawing area as an area to display an image photographed by the rear camera based on recognizing that, of the front camera and the rear camera, the rear camera is in an active state, and draw a black pattern in the drawing area based on recognizing that, of the front camera and the rear camera, the front camera is in an active state.

Various embodiments disclosed in this specification and drawings merely present specific examples in order to easily describe the technical contents according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

The invention claimed is:

1. An electronic device comprising:
 a display including a light passing area and a drawing area directly surrounding the light passing area;

a first camera arranged below the light passing area when the light passing area is viewed from above the display;

at least one processor operatively coupled to the display and the first camera; and a memory operatively connected to the at least one processor and storing instructions, wherein the at least one processor is configured to store an application in the memory, and the instructions, when executed by the at least one processor, cause the electronic device to draw a pattern in the drawing area based on an execution state of the application, wherein to draw the pattern includes to perform an operation of adjusting an inner diameter of the pattern to be wider than an inner diameter of the drawing area in a certain condition so as to enable light to enter through an inner part of the drawing area in which the pattern is not drawn and which directly surrounds the light passing area.

2. The electronic device of claim 1, wherein the instructions, when executed by the at least one processor, cause the electronic device to determine, as part of an operation of drawing the pattern on the drawing area, an attribute including a color of the pattern to be drawn on the drawing area, based on an execution state of the application.

3. The electronic device of claim 1, wherein the application includes a camera application, and wherein the instructions, when executed by the at least one processor, cause the electronic device to, as an operation of drawing the pattern on the drawing area, recognize that the first camera is in an active state according to execution of the camera application, and draw a pattern including a black color in the drawing area based on recognizing that the first camera is in the active state.

4. The electronic device of claim 3, wherein the active state indicates:

a state from when the first camera is powered-on until the first camera is powered-off;

a state from when the at least one processor starts receiving image data from the first camera until reception of image data from the first camera stops;

a state from when the at least one processor starts capturing an image by using the first camera until a process for the capturing is completed;

a state from when the image photographed by the first camera is displayed on the display until the displaying is stopped;

a state from when a photographing timer starts operating until the image photographed by the first camera is stored in the memory after termination of the timer;

a state from when moving image recording is started by using the first camera until the moving image recording is terminated; or a state from when a user input for image capture is generated until a predetermined time elapses.

5. The electronic device of claim 3, wherein the instructions, when executed by the at least one processor, cause the electronic device to perform an operation of adjusting a color of the pattern to be lighter than black when recognizing that a function to be executed by using the camera application is to apply an optical effect to an image to be photographed.

6. The electronic device of claim 3, wherein the instructions, when executed by the at least one processor, cause the electronic device to draw a moving pattern in the drawing area in response to start of a photographing timer, and draw the black pattern in the drawing area in response to termination of the timer.

7. The electronic device of claim 6, wherein the instructions, when executed by the at least one processor, cause the electronic device to, as at least part of the operation of drawing the moving pattern, perform:

an operation of gradually shortening a blinking interval as approaching the termination of the timer;

an operation of changing a color of the pattern to be drawn in the drawing area; or an operation of changing brightness and/or saturation while drawing a predetermined color in the drawing area.

8. The electronic device of claim 1, wherein the application includes an application for notification, wherein the instructions, when executed by the at least one processor, cause the electronic device to, as an operation of drawing the pattern in the drawing area, draw a moving pattern in the drawing area based on the execution of the application for notification, and wherein the notification informs a user of reception of a message or a call from an external device via a communication circuit provided in the electronic device, a time alarm, termination of a timer, or a measurement result obtained by using a sensor provided in the electronic device.

9. The electronic device of claim 1, wherein the application includes a media player, and wherein the instructions, when executed by the at least one processor, cause the electronic device to, as an operation of drawing the pattern in the drawing area, recognize that a media is being played by the media player, and display an animation effect corresponding to a sound according to the playing of the media via the drawing area.

10. The electronic device of claim 1, wherein the application includes a camera application, and wherein the instructions, when executed by the at least one processor, cause the electronic device to, as an operation of drawing the pattern in the drawing area, draw a black pattern in the drawing area in response to a user input for executing the camera application.

11. The electronic device of claim 1, wherein the display is disposed on a front surface of the electronic device, the electronic device further comprising a second camera operatively connected to the at least one processor and disposed on a rear surface of the electronic device, and wherein the instructions, when executed by the at least one processor, cause the electronic device to, as an operation of drawing the pattern in the drawing area, draw a black pattern in the drawing area in response to a user input for changing a camera to be used from the second camera to the first camera.

12. The electronic device of claim 1, wherein the light passing area is an area provided as an opening, a region having a lower pixel density than other areas of the display, or an area having no pixels.

13. The electronic device of claim 1, wherein the at least one processor includes a camera manager and a drawing module, wherein the camera manager is configured to observe an execution state of a camera application based on a request of the drawing module, recognize that the first camera is in an active state based on the observed execution state, and notify the drawing module that the first camera is in the active state, and wherein the drawing module is configured to draw a black pattern in the drawing area in response to the notification.

14. The electronic device of claim 1, wherein the display further includes a second light passing area and a second drawing area surrounding the second light passing area, wherein the electronic device further comprises a second camera operatively coupled to the at least one processor and arranged below the second light passing area when the second light passing area is viewed from above the display, and wherein the instructions, when executed by the at least one processor, cause the electronic device to draw a black pattern in a drawing area corresponding to a camera that is in an active state among the cameras and use the drawing area corresponding to a camera in an inactive state among the cameras as an area for displaying image information.

\* \* \* \* \*